United States Patent
Ma Gee

(10) Patent No.: US 6,226,823 B1
(45) Date of Patent: May 8, 2001

(54) TUBE CUTTING DEVICE

(76) Inventor: Robert D. Ma Gee, 9580 Silver Frost St., Las Vegas, NV (US) 89123

( * ) Notice: Subject to any disclaimer, the term of this patent is extended or adjusted under 35 U.S.C. 154(b) by 0 days.

(21) Appl. No.: 09/466,078

(22) Filed: Dec. 17, 1999

(51) Int. Cl.$^7$ ....................................................... B25F 1/00
(52) U.S. Cl. ..................................... 7/157; 7/163; 30/102
(58) Field of Search .............................. 7/157, 158, 163, 7/164, 160; 30/102

(56) References Cited

U.S. PATENT DOCUMENTS

| D. 375,239 | 11/1996 | Hall et al. . | |
|---|---|---|---|
| 508,077 | * 11/1893 | Anderson | 30/102 |
| 2,630,029 | * 3/1953 | Franck | 30/102 |
| 2,637,227 | * 5/1953 | McIntosh | 7/157 |
| 2,807,886 | 10/1957 | Aciego . | |
| 3,336,678 | 8/1967 | Chamberlain et al. . | |
| 3,376,638 | * 4/1968 | Bjalme et al. | 30/102 |
| 3,403,442 | * 10/1968 | Reese et al. | 30/102 |
| 3,520,057 | * 7/1970 | Gore et al. | 30/102 |
| 3,522,617 | * 8/1970 | Kowal | 7/157 |
| 4,611,358 | 9/1986 | Mills et al. . | |
| 4,923,392 | * 5/1990 | Moynihan, III | 7/151 |
| 5,099,577 | 3/1992 | Hutt . | |
| 5,238,335 | 8/1993 | Normura . | |

* cited by examiner

Primary Examiner—Joseph J. Hail, III
Assistant Examiner—Joni B. Danganan

(57) ABSTRACT

A tube cutting device for cutting tubes, holding a reamer, and containing measuring devices. The tube cutting device includes a base portion, having a facing wall, a back wall, a first side wall, a second side wall, a bottom wall and a top wall. A first bore in the base portion extends through the top and bottom walls of the base portion. A bar for mounting in the first bore has a first end and a second end. The bar has a first and second of opposing wall. The bar is slidably mounted in the first bore such that the second opposing wall faces the facing wall. A first slot in the bar extends into the second end of the bar. A circular knife for cutting a tube is rotatably mounted in the first slot of the bar. An arm portion is fixedly coupled to the first wall of the base portion. The arm portion has a generally J-shaped configuration. A plurality of rollers adapted for rolling contact with an exterior surface of the tube are rotatably mounted in an interior surface of the arm portion.

17 Claims, 4 Drawing Sheets

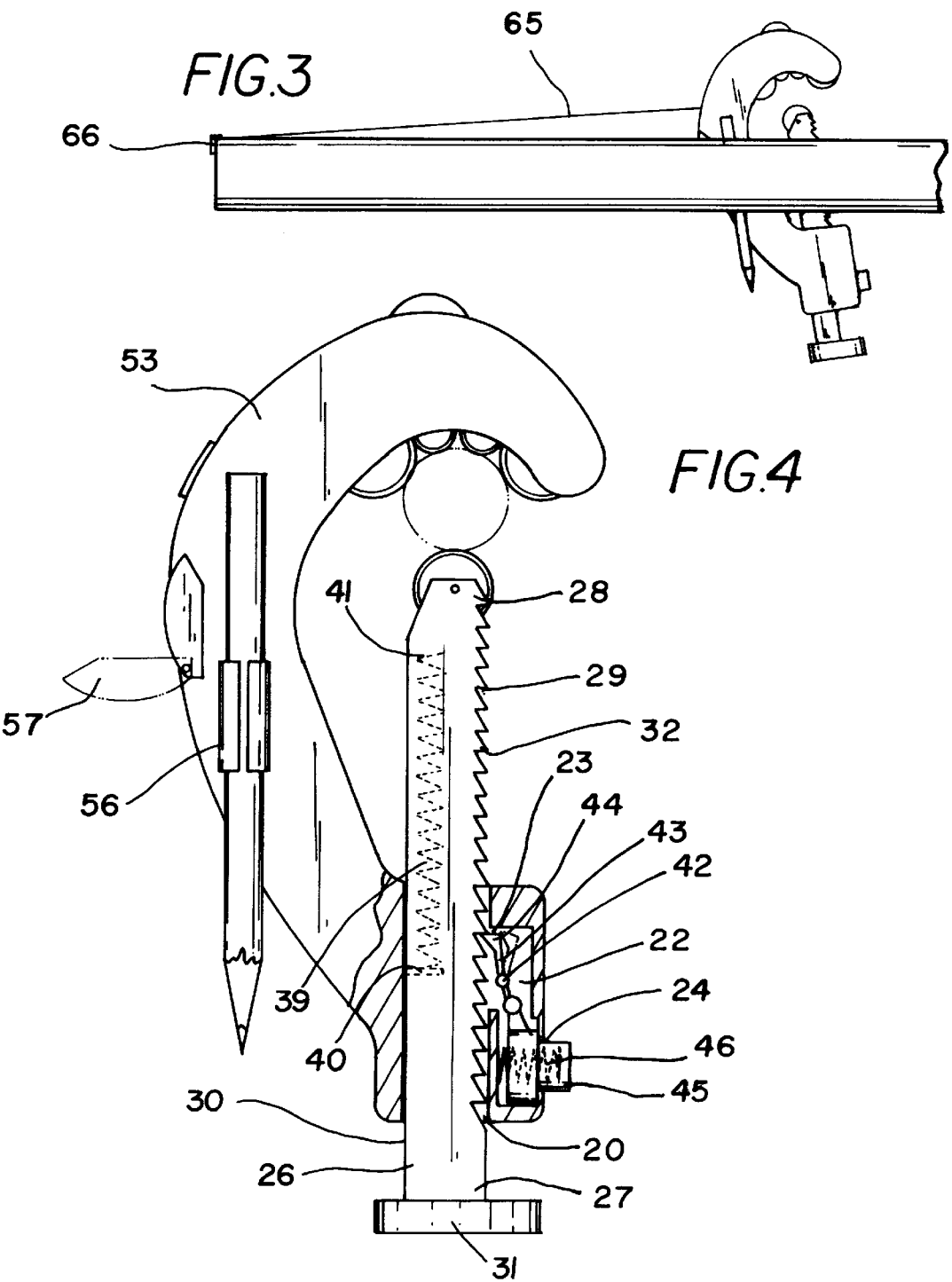

TUBE CUTTING DEVICE

BACKGROUND OF THE INVENTION

1. Field of the Invention

The present invention relates to cutting devices and more particularly pertains to a new tube cutting device for cutting tubes, holding a reamer, and containing measuring devices.

2. Description of the Prior Art

The use of cutting devices is known in the prior art. More specifically, cutting devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,611,358; U.S. Pat. No. 5,099,577; U.S. Pat. No. 3,336,678; U.S. Pat. No. 2,807,886; U.S. Des. Pat. No. 375,239; and U.S. Pat. No. 5,238,335.

While these devices fulfill their respective, particular objectives and requirements, the aforementioned patents do not disclose a new tube cutting device. The inventive device includes a base portion, having a facing wall, a back wall, a first side wall, a second side wall, a bottom wall and a top wall. A first bore in the base portion extends through the top and bottom walls of the base portion. A bar for mounting in the first bore has a first end and a second end. The bar has a first and second of opposing wall. The bar is slidably mounted in the first bore such that the second opposing wall faces the facing wall. A first slot in the bar extends into the second end of the bar. A circular knife for cutting a tube is rotatably mounted in the first slot of the bar. An arm portion is fixedly coupled to the first wall of the base portion. The arm portion has a generally J-shaped configuration. A plurality of rollers adapted for rolling contact with an exterior surface of the tube are rotatably mounted in an interior surface of the arm portion.

In these respects, the tube cutting device according to the present invention substantially departs from the conventional concepts and designs of the prior art, and in so doing provides an apparatus primarily developed for the purpose of cutting tubes, holding a reamer, and containing measuring devices.

SUMMARY OF THE INVENTION

In view of the foregoing disadvantages inherent in the known types of cutting devices now present in the prior art, the present invention provides a new tube cutting device construction wherein the same can be utilized for cutting tubes, holding a reamer, and containing measuring devices.

The general purpose of the present invention, which will be described subsequently in greater detail, is to provide a new tube cutting device apparatus and method which has many of the advantages of the cutting devices mentioned heretofore and many novel features that result in a new tube cutting device which is not anticipated, rendered obvious, suggested, or even implied by any of the prior art cutting devices, either alone or in any combination thereof.

To attain this, the present invention generally comprises a base portion, having a facing wall, a back wall, a first side wall, a second side wall, a bottom wall and a top wall. A first bore in the base portion extends through the top and bottom walls of the base portion. A bar for mounting in the first bore has a first end and a second end. The bar has a first and second of opposing wall. The bar is slidably mounted in the first bore such that the second opposing wall faces the facing wall. A first slot in the bar extends into the second end of the bar. A circular knife for cutting a tube is rotatably mounted in the first slot of the bar. An arm portion is fixedly coupled to the first wall of the base portion. The arm portion has a generally J-shaped configuration. A plurality of rollers adapted for rolling contact with an exterior surface of the tube are rotatably mounted in an interior surface of the arm portion.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new tube cutting device apparatus and method which has many of the advantages of the cutting devices mentioned heretofore and many novel features that result in a new tube cutting device which is not anticipated, rendered obvious, suggested, or even implied by any of the prior art cutting devices, either alone or in any combination thereof.

It is another object of the present invention to provide a new tube cutting device which may be easily and efficiently manufactured and marketed.

It is a further object of the present invention to provide a new tube cutting device which is of a durable and reliable construction.

An even further object of the present invention is to provide a new tube cutting device which is susceptible of a low cost of manufacture with regard to both materials and labor, and which accordingly is then susceptible of low prices of sale to the consuming public, thereby making such tube cutting device economically available to the buying public.

Still yet another object of the present invention is to provide a new tube cutting device which provides in the apparatuses and methods of the prior art some of the advantages thereof, while simultaneously overcoming some of the disadvantages normally associated therewith.

Still another object of the present invention is to provide a new tube cutting device for cutting tubes, holding a reamer, and containing measuring devices.

Yet another object of the present invention is to provide a new tube cutting device which includes a base portion, having a facing wall, a back wall, a first side wall, a second side wall, a bottom wall and a top wall. A first bore in the base portion extends through the top and bottom walls of the base portion. A bar for mounting in the first bore has a first end and a second end. The bar has a first and second of opposing wall. The bar is slidably mounted in the first bore such that the second opposing wall faces the facing wall. A first slot in the bar extends into the second end of the bar. A circular knife for cutting a tube is rotatably mounted in the first slot of the bar. An arm portion is fixedly coupled to the first wall of the base portion. The arm portion has a generally J-shaped configuration. A plurality of rollers adapted for rolling contact with an exterior surface of the tube are rotatably mounted in an interior surface of the arm portion.

Still yet another object of the present invention is to provide a new tube cutting device that removes the necessity of bringing multiple tools to a site by offering many devices needed within one device.

Even still another object of the present invention is to provide a new tube cutting device that contains electrically powered measuring devices.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a schematic side view of the present invention.

FIG. 4 is a schematic first side view of the present invention.

DESCRIPTION OF THE PREFERRED EMBODIMENT

Figure 1:
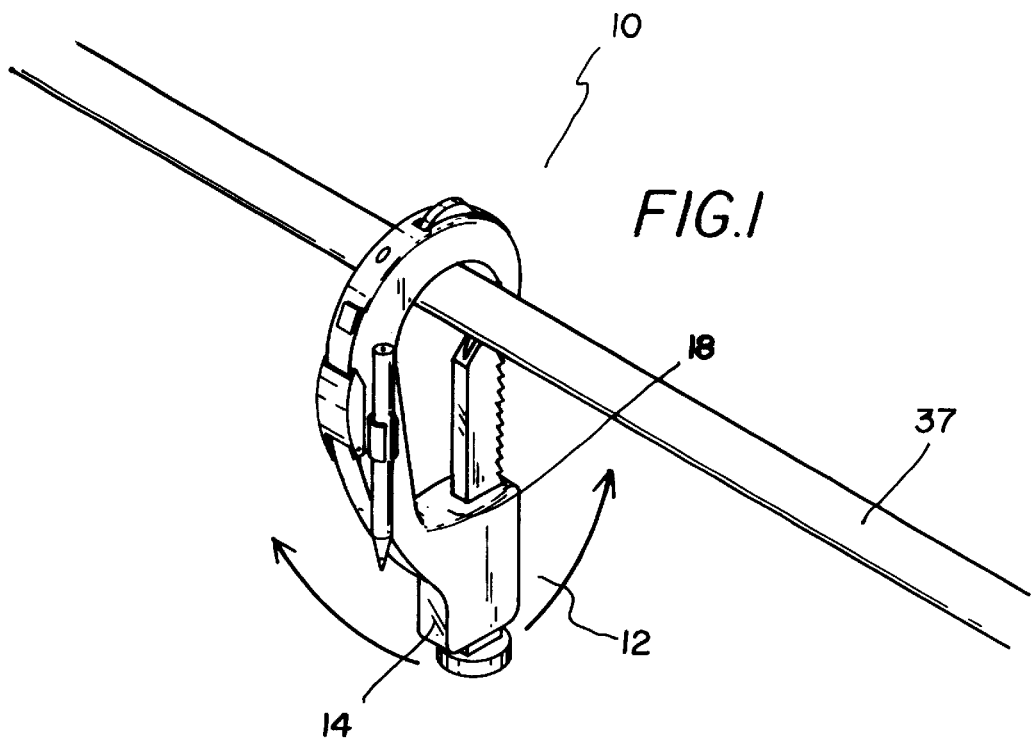
FIG. 1 is a schematic perspective view of a new tube cutting device according to the present invention.
Figure 2:
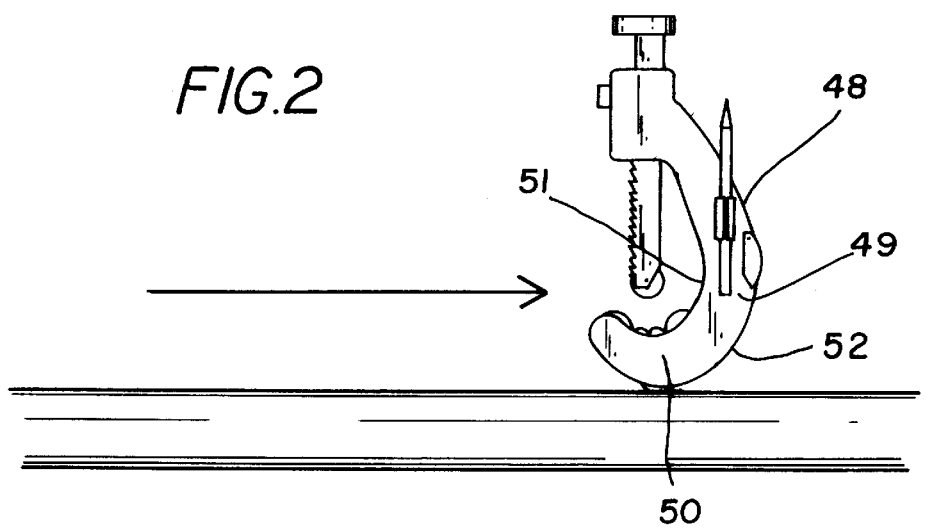
FIG. 2 is a schematic side view of the present invention.
Figure 5:
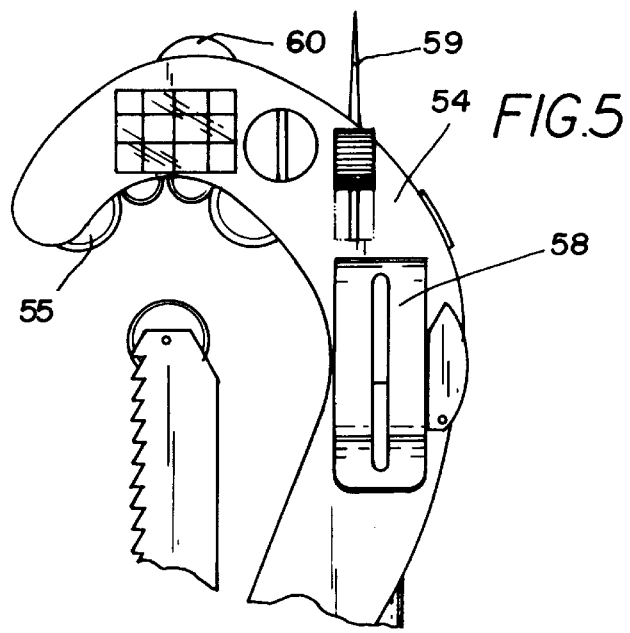
FIG. 5 is a schematic second side view of the present invention.
Figure 6:
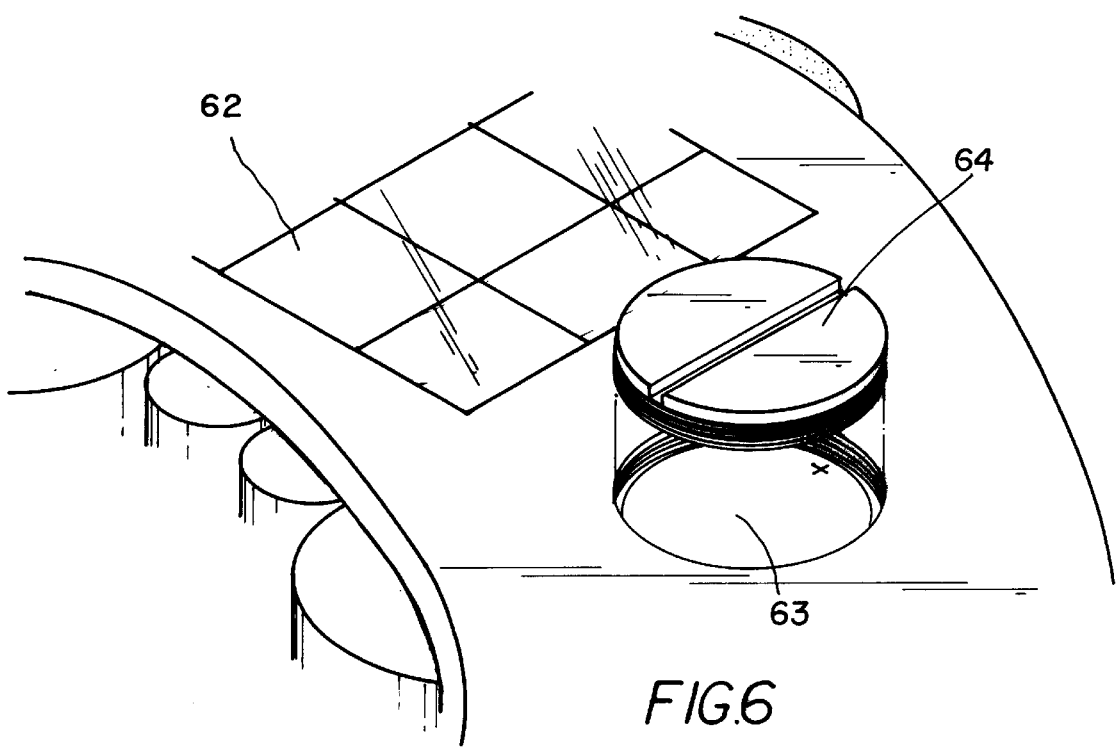
FIG. 6 is a schematic perspective view of the power source of the present invention.
Figure 7:
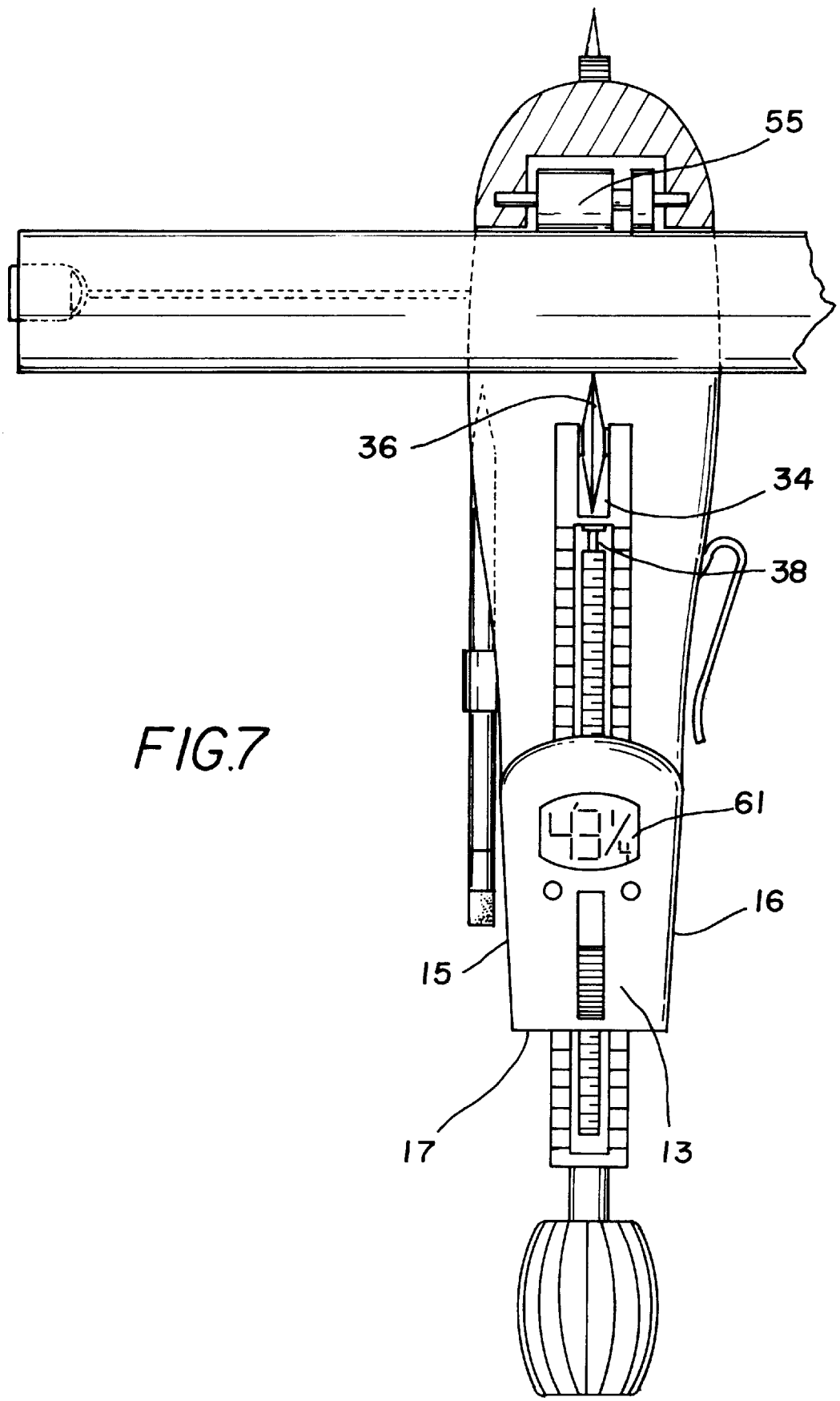
FIG. 7 is a schematic front view of the present invention.

With reference now to the drawings, and in particular to FIGS. 1 through 7 thereof, a new tube cutting device embodying the principles and concepts of the present invention and generally designated by the reference numeral 10 will be described.

As best illustrated in FIGS. 1 through 7, the tube cutting device 10 generally comprises a base portion 12. The base portion has a facing wall 13, a back wall 14, a first side wall 15, a second side wall 16, a bottom wall 17 and a top wall 18. Preferably each of the walls has a generally rectangular shape.

A first bore 20 in the base portion 12 extends through the top 18 and bottom 17 walls of the base portion. The first bore 20 has a generally rectangular shaped cross-section taken transverse to a longitudinal axis of the first bore.

A cavity 22 within an interior of the base portion 12 extends generally between the facing wall 13 and the first bore 20. A portion of the cavity has an opening 23 extending into the first bore. The opening 23 is located generally adjacent to the top wall 18 of the base portion.

A second bore 24 in the base portion 12 is in the facing wall 13 of the base portion 12. The second bore 24 extends into the cavity 22. Preferably, the second bore 24 is located generally adjacent to the bottom wall 17 of the base portion.

A bar 26 for mounting in the first bore 20 has a first end 27 and a second end 28. The bar 26 has a first 29 and second 30 opposing wall, wherein the bar 26 is slidably mounted in the first bore 20 such that the first opposing wall 29 faces the cavity 22 of the base portion. A first end of the bar has a plate 31 fixedly coupled thereto. The plate 31 has a plane oriented generally perpendicular to a longitudinal axis of the bar 26.

A plurality of notches 32 in the bar 26 is in the first opposing wall 29 of the bar.

A first slot 34 in the bar extends into the second end 28 of the bar 26. The first slot extends into the first and second opposing walls of the bar.

A circular knife 36 for cutting the tube 37 is rotatably mounted in the first slot of the bar.

A second slot 38 in the bar 26 is in the first opposing wall and extends through the second opposing wall of the bar. The second slot 38 extends a length of the bar between the first slot and the first end of the bar.

A first spring 39 urges the second end of the bar away from the top wall of the base portion. The first spring 39 has a first end 40 and a second end 41. The first spring 39 is in the second slot 38. The first end 40 of the first spring is fixedly coupled to the base portion 12. The second end 41 of the first spring is fixedly coupled to a portion of the second slot generally located adjacent to the first slot 34.

A selective securing means for selectively securing the bar with respect to the base portion comprises a pivot bar 42. The pivot bar is fixedly mounted in the cavity 22.

A pivot arm 43 is rotatably coupled to the pivot bar 42. The pivot arm has a first end and a second end.

A pawl 44 for selectively engaging the notches 32 extends from the first end of the pivot arm 43.

A button 45 for actuating the pawl 44 is fixedly coupled to the second end of the pivot arm 43. The button 45 is releasably mounted in the second bore 24 of the base potion 12. The button 45 moves between a depressed position and an unengaged position.

A second spring 46 urges the button 45 into the unengaged position. The spring is mounted in the cavity 22.

The pawl 44 selectively secures the notches 32 through the opening 23 in the cavity 22 when the button 45 is in an unengaged position. The pawl 44 releases from the notches when the button is in a depressed position.

An arm portion 48 is fixedly coupled to the back wall of the base portion. The arm portion has a generally J-shaped configuration. The arm portion has a long portion 49 and a hook portion 50. The arm portion has an interior wall 51, an exterior wall 52, a first side wall 53 and a second side wall 54. The interior wall 51 of the arm portion is generally opposed to the top wall 18 of the base portion 12 such that the hook portion is generally adjacent and opposed to the knife 36.

A plurality of rollers 55 adapted for rolling contact with an exterior surface of the tube 37 is rotatably mounted in the interior surface 51 of the arm portion 48. The rollers 55 are located generally in the hook portion 50 of the arm portion 48.

A bracket 56 for holding a pencil is located on the long portion 49 of the arm portion 48. The bracket 56 is on the first side wall 53 of the arm portion. Preferably, the bracket is a tension clamp.

A reamer 57 for enlarging holes is fixedly mounted to the arm portion. The reamer 57 is located generally adjacent to the bracket 56.

A clip 58 for holding the device to the belt of a user is fixedly mounted to the second side wall 54 of the arm portion. The clip 58 is generally located on the long portion 49 of the arm portion 48.

A scriber 59 is mounted in a bore in the exterior wall 52 of the hook portion 50 of the arm portion. The scriber 59 is fixedly coupled to a selectively engaging means adapted for raising and lowering the scriber.

A first measuring device comprises a wheel 60 rotatably mounted in the exterior wall of the hook portion.

A microprocessor, not shown, is adapted to convert rotation of the wheel into a length measurement. The microprocessor is operationally coupled to the wheel 60.

A display 61 displays information from the microprocessor. The display is mounted on the facing wall 13 of the base portion 12. The display is electrically coupled to the microprocessor.

A power supply powers the microprocessor. The power supply is ideally a solar panel 62 and a battery 63. The solar panel 62 is mounted in the second wall 53 and is generally located generally adjacent to the wheel 60 of the first measuring device. The battery 63 is for back-up power for times when there is insufficient light for the solar panel to power the microprocessor. The battery is mounted in the second wall and is generally located adjacent to the solar panel 62. The battery 63 is held in place by a screw cover 64. The power supply is electrically coupled to the microprocessor.

A second measuring device is a wire 65 releasably wound in the arm portion 48. The wire 65 has a first end having a tab 66 thereon. The tab 66 is outside of the arm portion. The microprocessor is adapted to convert withdrawing wire from the arm portion into a length measurement.

In use, the bar is lowered and the hook portion of the arm is placed around a tube. The bar is then extended to allow the circular blade to come in contact with the tube. The device is then turned about the tube in order to cut the tube. The measuring devices are used as standard measuring devices well known in the art.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A releasable tube cutting device for cutting tubes and wearing on the belt of a user, said device comprising:

a base portion, said base portion having a facing wall, a back wall, a first side wall, a second side wall, a bottom wall and a top wall;

a first bore in said base portion, said first bore extending through said top and bottom walls of said base portion;

a bar for mounting in said first bore, said bar having a first end and a second end, said bar having a first and a second opposing wall, wherein said bar is slidably mounted in said first bore such that said second opposing wall faces said facing wall;

a first slot in said bar, said first slot extending into said second end of said bar;

a knife for cutting a tube, said knife being a circular knife, said knife being rotatably mounted in said first slot of said bar;

an arm portion, said arm portion being fixedly coupled to said back wall of said base portion, said arm portion having a generally J-shaped configuration;

a plurality of rollers adapted for rolling contact with an exterior surface of the tube, said rollers being rotatably mounted in an interior surface of said arm portions;

wherein said generally J-shaped arm portion has a long portion and a hook portion, said arm portion having an interior wall, an exterior wall, a first side wall and a second side wall, said interior wall of said arm portion being generally opposed to said top wall of said base portion such that said hook portion is generally adjacent and opposed to said knife;

a bracket for holding a pencil, said bracket being located on said long portion of said arm portion, said bracket being on said first side wall of said arm portion.

2. The releasable tube cutting device for cutting tubes and wearing on the belt of a user as in claim 1, said device further comprising:

a cavity within an interior of said base portion, said cavity extending generally between said facing wall and said first bore, a portion of said cavity having an opening extending into said first bore, said opening being located generally adjacent to said top wall of said base portion;

a second bore in said base portion, said second bore being in said facing wall of said base portion, said second bore extending into said cavity;

a plurality of notches in said bar, said notches being in said second opposing wall of said bar;

a selective securing means for selectively securing said bar with respect to said base portion, said selective securing means comprising:

a pawl for selectively engaging said notches;

a button for actuating said pawl, said button being releasably mounted in said second bore of said base potion; and a second spring for urging said button into said unengaged position, said spring being mounted in said cavity.

3. The releasable tube cutting device for cutting tubes and wearing on the belt of a user as in claim 1, further including:

a reamer for enlarging holes, said reamer being fixedly mounted to said arm portion.

4. The releasable tube cutting device for cutting tubes and wearing on the belt of a user as in claim 3, further including:

a clip for holding said device to the belt of a user, said clip being fixedly mounted to said second side wall of said arm portion, said clip being generally located on said long portion of said arm portion.

5. The releasable tube cutting device for cutting tubes and wearing on the belt of a user as in claim 3, further comprising:

a scriber, said scriber being mounted in a bore in said exterior wall of said hook portion of said arm portion, said scriber being fixedly coupled to a selectively engaging means adapted for raising and lowering said scriber.

6. The releasable tube cutting device for cutting tubes and wearing on the belt of a user as in claim 1, further comprising:

a first measuring device, said first measuring device comprising:

a wheel, said wheel being rotatably mounted in said exterior wall of said hook portion, a microprocessor adapted to convert rotation of said wheel into a length measurement, said microprocessor being operationally coupled to said wheel;

a display for displaying information from said microprocessor, said display being mounted on said facing wall of said arm portion; and a power supply for powering said microprocessor, said power supply being a battery, said battery being mounted in said second wall and generally located adjacent to said solar panel.

7. The releasable tube cutting device for cutting tubes and wearing on the belt of a user as in claim 6, further comprising:

a second measuring device, said second measuring device being a wire releasably wound in said arm portion, said wire having a first end having a tab thereon, said tab being outside of said arm portion, said microprocessor being adapted to convert withdrawing wire from said arm portion into a length measurement.

8. A tube cutting device for cutting tubes and wearing on the belt of a user, said device comprising:

a base portion, said base portion having a facing wall, a back wall, a first side wall, a second side wall, a bottom wall and a top wall;

a first bore in said base portion, said first bore extending through said top and bottom walls of said base portion;

a bar for mounting in said first bore, said bar having a first end and a second end, said bar having a first and a second opposing wall, wherein said bar is slidably mounted in said first bore such that said second opposing wall faces said facing wall;

a first slot in said bar, said first slot extending into said second end of said bar;

a knife for cutting a tube, said knife being a circular knife, said knife being rotatably mounted in said first slot of said bar;

an arm portion, said arm portion being fixedly coupled to said back wall of said base portion, said arm portion having a generally J-shaped configuration;

a plurality of rollers adapted for rolling contact with an exterior surface of the tube, said rollers being rotatably mounted in an interior surface of said arm portion;

wherein said generally J-shaped arm portion has a long portion and a hook portion, said arm portion having an interior wall, an exterior wall, a first side wall and a second side wall, said interior wall of said arm portion being generally opposed to said top wall of said base portion such that said hook portion is generally adjacent and opposed to said knife;

a reamer for enlarging holes, said reamer being fixedly mounted to said arm portion; and a scriber mounted in a bore on said hook portion of said arm portion, said scriber being fixedly coupled to a selectively engaging means for selectively extending and retracting said scriber with respect to said bore.

9. The releasable tube cutting device for cutting tubes and wearing on the belt of a user as in claim 8, further including:

a bracket for holding a pencil, said bracket being located on said long portion of said arm portion.

10. The tube cutting device of claim 8, said device further comprising:

a cavity within an interior of said base portion, said cavity extending generally between said facing wall and said first bore, a portion of said cavity having an opening extending into said first bore, said opening being located generally adjacent to said top wall of said base portion;

a second bore in said base portion, said second bore being in said facing wall of said base portion, said second bore extending into said cavity;

a plurality of notches in said bar, said notches being in said second opposing wall of said bar;

a selective securing means for selectively securing said bar with respect to said base portion, said selective securing means comprising:

a pawl for selectively engaging said notches;

a button for actuating said pawl, said button being releasably mounted in said second bore of said base potion; and a second spring for urging said button into said unengaged position, said spring being mounted in said cavity.

11. The tube cutting device of claim 8, further including a clip for holding said device to the belt of a user, said clip being mounted on said arm portion.

12. A tube cutting device for cutting tubes and wearing on the belt of a user, said device comprising:

a base portion, said base portion having a facing wall, a back wall, a first side wall, a second side wall, a bottom wail and a top wall;

a first bore in said base portion, said first bore extending through said top and bottom walls of said base portion;

a bar for mounting in said first bore, said bar having a first end and a second end, said bar having a first and a second opposing wall, wherein said bar is slidably mounted in said first bore such that said second opposing wall faces said facing wall;

a first slot in said bar, said first slot extending into said second end of said bar;

a knife for cutting a tube, said knife being a circular knife, said knife being rotatably mounted in said first slot of said bar;

an arm portion, said arm portion being fixedly coupled to said back wall of said base portion, said arm portion having a generally J-shaped configuration;

a plurality of rollers adapted for rolling contact with an exterior surface of the tube, said rollers being rotatably mounted in an interior surface of said arm portion;

wherein said generally J-shaped arm portion has a long portion and a hook portion, said arm portion having an interior wall, an exterior wall, a first side wall and a second side wall, said interior wall of said arm portion being generally opposed to said top wall of said base portion such that said hook portion is generally adjacent and opposed to said knife;

a first measuring device, said first measuring device comprising:
  a wheel, said wheel being rotatably mounted in said exterior wall of said hook portion,
  a microprocessor adapted to convert rotation of said wheel into a length measurement, said microprocessor being operationally coupled to said wheel;
  a display for displaying information from said microprocessor, said display being mounted on said facing wall of said arm portion; and a power supply for powering said microprocessor, said power supply being a battery, said battery being mounted in said second wall and generally located adjacent to said solar panel.

13. The tube cutting device of claim 12, further comprising a second measuring device, said second measuring device being a wire releasably wound in said arm portion, said wire having a first end having a tab thereon, said tab being outside of said arm portion, said microprocessor being adapted to convert withdrawing wire from said arm portion into a length measurement.

14. The tube cutting device of claim 12, said device further comprising:

a cavity within an interior of said base portion, said cavity extending generally between said facing wall and said first bore, a portion of said cavity having an opening extending into said first bore, said opening being located generally adjacent to said top wall of said base portion;

a second bore in said base portion, said second bore being in said facing wall of said base portion, said second bore extending into said cavity;

a plurality of notches in said bar, said notches being in said second opposing wall of said bar;

a selective securing means for selectively securing said bar with respect to said base portion, said selective securing means comprising:

a pawl for selectively engaging said notches;

a button for actuating said pawl, said button being releasably mounted in said second bore of said base potion; and a second spring for urging said button into said unengaged position, said spring being mounted in said cavity.

15. The tube cutting device of claim 12, further including a bracket for holding a pencil, said bracket being located on said long portion of said arm portion.

16. The tube cutting device of claim 12, further including a reamer for enlarging holes, said reamer being fixedly mounted to said arm portion.

17. The tube cutting device of claim 12, further including a clip for holding said device to the belt of a user, said clip being mounted on said arm portion.

* * * * *